(12) United States Patent
Simms et al.

(10) Patent No.: US 11,653,357 B2
(45) Date of Patent: May 16, 2023

(54) SYSTEM AND METHOD FOR RADIO FREQUENCY UPLINK PERFORMANCE ASSESSMENT UTILIZING DOWNLINK ERASURE FRAME ANALYSIS

(71) Applicant: MOTOROLA SOLUTIONS, INC., Chicago, IL (US)

(72) Inventors: Matthew E Simms, Davie, FL (US); Jesus F Corretjer, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 318 days.

(21) Appl. No.: 17/120,303

(22) Filed: Dec. 14, 2020

(65) Prior Publication Data
US 2022/0191857 A1    Jun. 16, 2022

(51) Int. Cl.
*H04W 4/00* (2018.01)
*H04W 72/21* (2023.01)
*H04W 84/12* (2009.01)
*H04L 1/18* (2023.01)
*H04W 72/0446* (2023.01)

(52) U.S. Cl.
CPC ............. *H04W 72/21* (2023.01); *H04L 1/18* (2013.01); *H04W 72/0446* (2013.01); *H04W 84/12* (2013.01)

(58) Field of Classification Search
CPC ............ H04L 1/201; H04L 1/203; H04L 1/22
See application file for complete search history.

(56) References Cited

U.S. PATENT DOCUMENTS

| | | | |
|---|---|---|---|
| 6,466,905 B1 | 10/2002 | Pappas | |
| 9,871,720 B1 | 1/2018 | Tillotson | |
| 2004/0095918 A1* | 5/2004 | Dominique | ........... H04L 1/0054 370/342 |
| 2006/0146873 A1* | 7/2006 | Morgan | ................ H04L 1/0014 370/468 |
| 2015/0067006 A1 | 3/2015 | Miglore | |

\* cited by examiner

*Primary Examiner* — Bo Hui A Zhu

(57) ABSTRACT

Techniques for radio frequency uplink performance assessment utilizing downlink erasure frame analysis are provided. An indication of if a received frame has been determined to be an erasure frame is received from a plurality of receiver wireless communications devices. The indications of if the received frame has been determined to be an erasure frame are aggregated. The frame identified by the frame identifier is declared to be an erasure frame when at least one of the plurality of wireless communications devices has indicated the received frame has been determined to be an erasure frame. That an error occurred on an uplink between the sender wireless communication device and the RAN is determined when the frame is declared an erasure frame.

20 Claims, 8 Drawing Sheets

400

- 405 — COLLECT ERASURE FRAME DECLARATIONS FOR A PLURALITY OF FRAME IDENTIFIERS
  - 410 — RECEIVE, AT A COMPUTING DEVICE, FROM EACH OF A PLURALITY OF RECEIVER WIRELESS COMMUNICATIONS DEVICES, AN INDICATION OF IF A RECEIVED FRAME HAS BEEN DETERMINED TO BE AN ERASURE FRAME, THE FRAME HAVING BEEN SENT BY A RADIO ACCESS NETWORK (RAN) TO THE PLURALITY OF RECEIVER WIRELESS COMMUNICATIONS DEVICES AND IDENTIFIED BY A FRAME IDENTIFIER, THE FRAME HAVING BEEN SENT TO THE RAN FROM A SENDER WIRELESS COMMUNICATIONS DEVICE
  - 415 — AGGREGATE THE INDICATIONS OF IF THE RECEIVED FRAME HAS BEEN DETERMINED TO BE AN ERASURE FRAME FOR THE FRAME IDENTIFIED BY THE FRAME IDENTIFIER
  - 420 — DECLARE THE FRAME IDENTIFIED BY THE FRAME IDENTIFIER TO BE AN ERASURE FRAME WHEN AT LEAST ONE OF THE PLURALITY OF WIRELESS COMMUNICATIONS DEVICES HAS INDICATED THE RECEIVED FRAME IDENTIFIED BY THE FRAME IDENTIFIER HAS BEEN DETERMINED TO BE AN ERASURE FRAME
  - 425 — DECLARE THE FRAME IDENTIFIED BY THE FRAME IDENTIFIER TO BE A GOOD FRAME WHEN AT LEAST ONE RECEIVER WIRELESS COMMUNICATION DEVICE PROVIDES AN INDICATION OF A GOOD FRAME
  - 430 — DECLARE THE FRAME IDENTIFIED BY THE FRAME IDENTIFIER TO BE A BAD FRAME WHEN NO RECEIVER WIRELESS COMMUNICATIONS DEVICES INDICATE AN ERASURE FRAME OR A GOOD FRAME
  - 435 — DETERMINE THAT AN ERROR OCCURRED ON AN UPLINK BETWEEN THE SENDER WIRELESS COMMUNICATION DEVICE AND THE RAN WHEN THE FRAME IDENTIFIED BY THE FRAME IDENTIFIER WAS SENT TO THE RAN BY THE SENDER WIRELESS COMMUNICATIONS DEVICE WHEN THE FRAME IS DECLARED AN ERASURE FRAME

- 440 — COMPUTE AN ERASURE FRAME RATE FOR THE UPLINK BETWEEN THE SENDER WIRELESS COMMUNICATIONS DEVICE AND THE RAN (A)

*FIG. 4A*

SYSTEM AND METHOD FOR RADIO FREQUENCY UPLINK PERFORMANCE ASSESSMENT UTILIZING DOWNLINK ERASURE FRAME ANALYSIS

BACKGROUND

A Radio Access Network (RAN) is a Radio Frequency (RF) network that allows wireless communications. One example of such a RAN is the Land Mobile Radio (LMR) network used by public safety (e.g. police, fire emergency medical services, etc.) personnel. Another example of a RAN is Long Term Evolution (LTE) cellular networks operated to provide communications for devices such as smartphones, tablets, smart watches, etc. Yet another example of a RAN may be wireless networks provided by technologies such as WiFi™.

Initial deployment of a RAN requires a large amount of engineering effort. RF engineering is performed to determine the correct number of RAN access points (e.g. base stations, cell towers, hotspots, etc.) that are required and where those access points should be located within a region to achieve proper RF coverage over the desired area. RF power management is engineered to ensure that there are no dead spots within the coverage area while at the same time ensuring that RF signal levels do not get so high as to cause interference within the RAN or with neighboring RANs. A lot of the initial planning may be done using simulations or computer modeling of RF propagation, desired coverage area, geographic topology, etc.

Although simulation and computer modeling of a RAN may provide a good start, at some point the RAN is physically deployed and real life measurements of RF characteristics are made. Deviations between the planned RAN coverage and the actual RAN coverage need to be addressed. For example, there may have existed conditions in the real world that were not accounted for in the simulations or models.

Once the RAN has been established, the process of monitoring and optimizing the RAN does not end. Changes could occur in the coverage area that alter operation (e.g. new skyscraper is built blocking RF signal propagation, a different RAN is installed causing interference, etc.) of the RAN. In addition, there could be problems with the RAN hardware that develop over time (e.g. receivers at base stations fall out of calibration, etc.). RANs are typically access by subscriber devices (e.g. public safety radios, smartphones, tablets, watches, etc.). Problems could exist with those devices as well. As such, monitoring an optimization of a RAN is an ongoing process that occurs throughout the lifespan of the RAN.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

FIGS. 4A and 4B are an example of a flowchart depicting an implementation of the radio frequency uplink performance assessment utilizing downlink erasure frame analysis techniques described herein.

Figure 1:
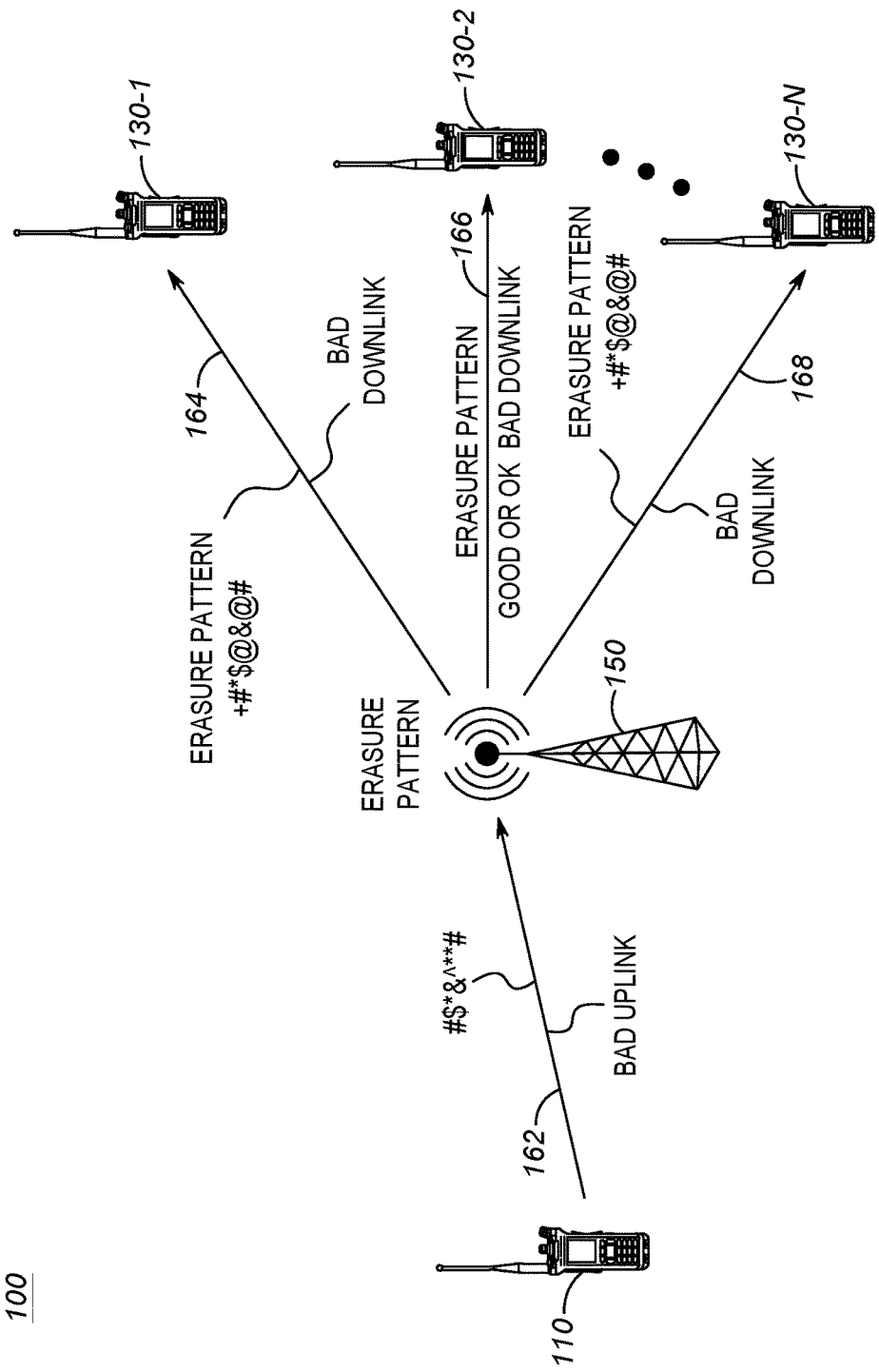
FIG. 1 is an example environment in which the radio frequency uplink performance assessment utilizing downlink erasure frame analysis may be implemented.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

As mentioned above, the process of monitoring the RAN for problems does not stop once the RAN has been deployed. The RAN may be periodically or continuously monitored to detect degradation in performance. For purposes of the remainder of this discussion, the RAN described will be in terms of an Association of Public-Safety Communications Officials (APCO) Project 25 (P25) LMR system that is widely used in North America and elsewhere for public safety wireless communications. It should be understood that this is for purposes of ease of description, rather than by way of limitation. The techniques are applicable in any RAN that utilizes an architecture in which a base station receives data from a radio device (e.g. walkie talkie, portable radio, mobile radio, etc.) and retransmits that data to other radio devices.

Once example of a performance metric on a RAN that may be monitored is a bit error rate (BER) for both uplink (i.e. from radio device to base station) and downlink (i.e. from base station to radio device) communications channels. Some currently available radio devices allow for collection of downlink BER and subsequent reporting of same. In some cases, the reporting of the downlink BER is done over a RAN that is different than the RAN for which the measurements were taken. For example, some currently available public safety radios have the ability to communicate over both the P25 LMR network as well as a commercially available LTE network. The radio device may capture downlink BER information and report that information via the LTE network. Such reporting may be done over a different network to reduce load on the LMR network. In other cases, the reporting may be done over the same RAN.

On the uplink side (i.e. from the radio device to the base station) a similar measurement can be made by the base station. The base station can record BER from transmissions received from the radio devices. This information can be stored and later used to detect problems on the radio uplink.

In many cases, the RAN owner contracts operation and/or optimization of the RAN to a third party. The third party may remotely monitor the operation of the RAN and the radio devices to gain insight into the operation of the RAN. Based on this observation, the third party may use the data gathered to maintain and/or improve the performance of the RAN.

The radio devices themselves may be accessible via a separate RAN (e.g. an LTE RAN). Because of this, the network operator may have fewer concerns with allowing a third party to access the data stored on the radio devices (e.g. the downlink BER) over a separate network. In some cases, the RAN owner may allow the data on the radio device to be accessed over the LTE RAN, because the radio devices themselves may not pose any extraordinary security risk, as they are an individual device.

A problem arises in that many RAN owners do not want and/or allow external access to their RAN because it may be perceived as a security threat. As the RAN may be considered mission critical infrastructure, to prevent even the possibility of a security threat (e.g. denial of service attacks, ransomware, etc.) that could disrupt communication for the entire coverage area, the network owner may prohibit any access to the RAN from an external source, including the third party responsible for operating/optimizing the RAN. If an external connection to the RAN is not available, the third party is not able to obtain the uplink BER measurements stored by the base station.

The techniques described herein overcome this problem by making use of normal base station operation. In a P25, and other, systems, when a data frame is received from a radio device, there are three possible outcomes. The first is the frame is received with no bit errors (or with a small enough number of bit errors that it is considered error free). The second outcome is that the frame is received with bit errors, but the built in error correction protocols (e.g. Cyclic Redundancy Check, Forward Error Control, etc.) are able to correct the errors well enough that the resultant frame can be still be used. It should be understood that from a functional perspective, there is very little difference between the first two outcomes. They both result in a data frame that can be transmitted over the downlink to receiver radio devices.

The third possible outcome is that the data frame received by the base station contains so many bit errors that the frame cannot be corrected and is essentially useless. The base station must transmit something to the receiver radios for purposes of timing synchronization, but it would be pointless to transmit a data frame that is useless. Instead, the base station replaces the useless data frame with an erasure frame. An erasure frame is a data frame with known, defined contents. An erasure frame also has the characteristic that no valid data frame would ever include the contents of the erasure frame, thus there being no possibility of confusing an erasure frame with a valid frame. When a receiving radio receives and detects an erasure frame, it does not attempt to decode the frame because an erasure frame contains no valid data. The receiving radio may take some alternative action when receiving an erasure frame (e.g. mute audio output, repeat audio from previous frame, etc.).

Receipt of an erasure frame indicates that there was a problem on the uplink of the data frame from the sending radio device to the base station. As will be discussed in further detail below, information related to the base station, the sender radio device location and channel, and other data may be used to further identify possible reasons why the erasure frame was generated. Because the receipt of erasure frames could be detected and stored by the receiving radio device, the presence of erasure frames would provide an indication of errors on the uplink, without requiring access to the RAN infrastructure. Because the network owner my typically allow access to the radio devices, the information gathered based on the receipt of erasure frames can be made available to the third party.

An additional problem arises in that erasure frames typically include no form of error correction. Thus, if an erasure frame is received by a receiving radio device with errors that exceed a threshold level, the receiving radio device may not be able to determine if the frame was an erasure frame or a valid frame that had errors introduced on the downlink (thus indicating a downlink problem with the individual receiving radio). To overcome this problem, erasure frame receipt information is captured from all receiving radio devices. If at least one receiving radio device determines that the received frame was an erasure frame, then it is declared that the particular frame was indeed an erasure frame, regardless of what any of the other receiving radio devices report. The reason for this being that if at least one receiving radio device received an erasure frame, that means the base station sent an erasure frame. The only way this would happen is when the data frame received by the base station over the uplink was of such poor quality that it was uncorrectable and effectively useless. Such information may then be used to assess the quality of radio uplink in the RAN.

A method is provided. The method comprises receiving, at a computing device, from each of a plurality of receiver wireless communications devices, an indication of if a received frame has been determined to be an erasure frame, the frame having been sent by a Radio Access Network (RAN) to the plurality of receiver wireless communications devices and identified by a frame identifier, the frame having been sent to the RAN from a sender wireless communications device. The method further comprises aggregating the indications of if the received frame has been determined to be an erasure frame for the frame identified by the frame identifier. The method further comprises declaring the frame identified by the frame identifier to be an erasure frame when at least one of the plurality of wireless communications devices has indicated the received frame identified by the frame identifier has been determined to be an erasure frame. The method further comprises determining that an error occurred on an uplink between the sender wireless communication device and the RAN when the frame identified by the frame identifier was sent to the RAN by the sender wireless communications device when the frame is declared an erasure frame.

In one aspect, the method further comprises collecting erasure frame declarations for a plurality of frame identifiers and computing an erasure frame rate for the uplink between the sender wireless communications device and the RAN. In one aspect, the method further comprises recording at least one of a location, a time, a device identifier, and a channel in use of the sender wireless communications device. In one aspect, the method further comprises computing an erasure frame rate for the uplink between a plurality of sender wireless communications devices and the RAN by repeating the steps of receiving, aggregating, declaring, determining, collecting, computing, and recording, for each of the plurality of sender wireless communications devices.

In one aspect, the method further comprises determining a fault exists on an individual sender wireless communications device of the plurality of wireless communications devices when the erasure frame rate for the individual sender wireless communications device exceeds a threshold and the erasure frame rate for other sender wireless communications devices of the plurality of wireless communications devices in a same vicinity as the individual sender wireless communications device does not exceed the threshold value.

In one aspect, the method further comprises determining a fault exists in the RAN when at least two sender wireless communications devices in a same vicinity have erasure frame error rates that exceed a threshold. In one aspect, the method further comprises declaring the frame identified by the frame identifier to be a good frame when at least one receiver wireless communication device provides an indication of a good frame and declaring the frame identified by the frame identifier to be a not good frame when no receiver wireless communications devices indicate an erasure frame or a good frame.

A non-transitory processor readable medium containing a set of instructions thereon is provided. The instructions, when executed by the processor cause the processor to receive, at a computing device, from each of a plurality of receiver wireless communications devices, an indication of if a received frame has been determined to be an erasure frame, the frame having been sent by a Radio Access Network (RAN) to the plurality of receiver wireless communications devices and identified by a frame identifier, the frame having been sent to the RAN from a sender wireless communications device. The instructions further cause the processor to aggregate the indications of if the received frame has been determined to be an erasure frame for the frame identified by the frame identifier. The instructions further cause the processor to declare the frame identified by the frame identifier to be an erasure frame when at least one of the plurality of wireless communications devices has indicated the received frame identified by the frame identifier has been determined to be an erasure frame. The instructions further cause the processor to determine that an error occurred on an uplink between the sender wireless communication device and the RAN when the frame identified by the frame identifier was sent to the RAN by the sender wireless communications device when the frame is declared an erasure frame.

In one aspect, the instructions further cause the processor to collect erasure frame declarations for a plurality of frame identifiers and compute an erasure frame rate for the uplink between the sender wireless communications device and the RAN. In one aspect, the instructions further cause the processor to record at least one of a location, a time, a device identifier, and a channel in use of the sender wireless communications device. In one aspect, the instructions further cause the processor to compute an erasure frame rate for the uplink between a plurality of sender wireless communications devices and the RAN by repeating the steps of receiving, aggregating, declaring, determining, collecting, computing, and recording, for each of the plurality of sender wireless communications devices.

In one aspect, the instructions further cause the processor to determine a fault exists on an individual sender wireless communications device of the plurality of wireless communications devices when the erasure frame rate for the individual sender wireless communications device exceeds a threshold and the erasure frame rate for other wireless communications devices of the plurality of wireless communications devices in a same vicinity as the individual sender wireless communications device does not exceed the threshold value.

In one aspect, the instructions further cause the processor to determine a fault exists in the RAN when at least two sender wireless communications devices in a same vicinity have erasure frame error rates that exceeds a threshold. In one aspect, the instructions further cause the processor to declare the frame identified by the frame identifier to be a good frame when at least one receiver wireless communication device provides an indication of a good frame and declare the frame identified by the frame identifier to be a not good frame when no receiver wireless communications devices indicate an erasure frame or a good frame.

A device is provided. The device includes a radio frequency (RF) receiver to receive RF signals over an air interface from a Radio Access Network. The device further includes a digital receiver to convert the received RF signals to a baseband frame, the baseband frame identified by a frame identifier. The device further includes an erasure frame detector to compare the baseband frame to a reference erasure frame, the erasure frame detector configured to declare the baseband frame an erasure frame based on the comparison, the erasure frame detector further configured to store the declaration of the erasure frame for later reporting to an analysis system.

In one aspect, declaring the baseband frame identified by the frame identifier to be an erasure frame further comprises declaring the baseband frame to be an erasure frame when differences between the baseband frame and the reference erasure frame are below a threshold. In one aspect, the erasure frame detector is integrated within a forward error correction (FEC) decoder. In one aspect, the erasure frame detector is integrated within a voice decoder.

In one aspect, the erasure frame detector is further configured to store the erasure frame declarations for a plurality of baseband frames and report the erasure frame declarations for the plurality of baseband frames. In one aspect, reporting the erasure frame declarations further comprises reporting the erasure frame declarations when connected to a RAN that is different than a RAN from which the baseband frame was received, wherein the RAN from which the baseband frame was received is a Land Mobile Radio (LMR) RAN and the RAN that is different is one of a Long Term Evolution (LTE) RAN and a WiFi RAN.

Further advantages and features consistent with this disclosure will be set forth in the following detailed description, with reference to the figures.

FIG. 1 is an example environment in which the radio frequency uplink performance assessment utilizing downlink erasure frame analysis may be implemented. Environment 100 may include sender wireless communications device 110, receiver wireless communications devices 130-1 . . . N, and Radio Access Network (RAN) 150.

Sender wireless communications device 110 may be any type of communications device that is able to communicate with RAN 150. For example, sender wireless communications device 110 may be a LMR radio (e.g. walkie talkie, patrol vehicle radio, etc.) that may be used by public safety personnel (e.g. police officers, Fire, emergency medical services, etc.) in order to communicate with dispatchers and each other. Sender wireless communications devices could, for example, be P25 LMR radios. Although sender wireless communications device 110 is described as being a sending device, this is for purposes of ease of description of operation. An actual sender wireless communications device would generally be capable of receiving wireless communications from the RAN as well. Although only a single sender wireless communications device is shown, it should be understood that there may be any number of such devices and a single device is shown only for ease of description.

The particular form of sender wireless communication device 110 is relatively unimportant. Any sender wireless communications device 110 that transmits digital data in the form of frames could be utilized with the techniques described herein. For example, in the P25 architecture, a communications channel with a defined bandwidth (e.g. 9.6 Kilobit per second (Kbps)) is provided. This bandwidth may be broken down into frames. Each frame may include multiple types of sub-frames that carry different types of information. For example, some sub-frames may carry signaling information (e.g. device identifiers, etc.). Some sub-frames may carry voice data. Some sub-frames may carry other data (e.g. location data, etc.). For purposes of this description, the useful data carried by the frame will be referred to as the payload of the frame, or simply the payload.

In addition to payload, the frame may also include various forms of error correction. As is well known, wireless transmission of data is subject to the introduction of errors during transmission. These errors may have many different causes. For example, errors may be caused by improperly calibrated equipment, poor RF signal strength, poor RAN design/maintenance, RF interference from other devices, natural sources of interference (e.g. cosmic radiation, etc.), etc. The particular source of the errors is relatively unimportant.

The error correction may be used to correct errors that may be introduced. There are many different types of error correction, sometimes referred to as error corrections codes. The techniques described herein are usable with any form of error correction. What should be understood is that error correction allows for errors in a frame to be corrected as long as the number of errors is below a defined threshold. Different error correction codes can correct different numbers of bit errors and as such have different thresholds. Some error correction codes may correct some, but not all errors. In such cases it may be up to the RAN to determine if the correction was "good enough" for the frame to still be used.

In some cases, error correction is not able to correct the frame sufficiently for continued use of the frame. In such cases, the payload of the frame may be discarded, because it is no longer usable. As will be explained in further detail below, the RAN may replace a frame that cannot be sufficiently corrected with a special frame called an erasure frame. Although the term erasure frame is referenced in several protocols, it should be understood that the term erasure frame is being used to designate a frame whose contents are not usable. Any protocol specific term to indicate such a frame is encompassed by the use of the term erasure frame. Operation of an erasure frame is described in further detail below.

Environment 100 may also include receiver wireless communication devices 130-1 . . . N. Receiver wireless communications devices 130-1 . . . N may be any type of device that is capable of receiving frames transmitted wirelessly from RAN 150. As mentioned above, receiver wireless communications devices generally also include the same functionality as sender wireless communications devices, and the distinction is made simply for ease of description.

Environment 100 may also include Radio Access Network 150. RAN 150 may be any radio access network in which frames including error correction codes are received from a sender wireless communications device 110 and are then retransmitted (e.g. repeated, etc.) wirelessly to receiver wireless communications devices 130. One example of such a RAN is an P25 LMR RAN. Other examples, can include terrestrial trunked radio (TETRA) systems, Digital Mobile Radio (DMR) systems, Personal Communications Radio (PCR) systems, etc.

In operation, a sender wireless communications device 110 may send 162 a frame to the RAN 150 via a wireless uplink from the sender wireless communication device to the RAN. In the example, shown in FIG. 1, assume that the uplink channel is a bad uplink and introduces errors into the frame. As mentioned above, the frame may include one or more forms of error correction codes that have the potential of correcting the errors introduced on the uplink channel.

Upon receipt of the frame, the RAN 150 may process the frame, using the error correction codes, to determine if any errors were introduced into the frame and if those errors can be sufficiently corrected. If the frame that was received contained no errors or all errors could be corrected, the RAN may then rebroadcast the frame to receiver wireless devices 130 over the downlink between the RAN and the receiver wireless devices. In some cases, the frame may contain errors that could not be corrected by the error correction codes, but the errors were small enough that the payload is still usable. For example, if a payload included vocoded voice, a small number of uncorrected bits would not be an issue. In such cases, the RAN treats the frame as if it were error free and retransmits the frame (with possible re-computation of the error correction codes) to the receiver wireless devices over the downlink even though the frame includes errors. What should be understood is the RAN determines if the frame is sufficiently error free, with or without correction, to be retransmitted with or without modification to the error correction codes.

In some cases, the frame may include so many errors that the error correction codes are not able to correct them all. If the errors that remain after the correction attempt are large enough that the RAN 150 determines the frame is unusable, the RAN may create and transmit 164-168 a frame that includes an erasure pattern, operation of which is described in further detail below. A frame including an erasure pattern may also be referred to as an erasure frame. One characteristic of an erasure frame is that it is defined to include a bit pattern that would never be seen in an actual valid frame. One additional characteristic of an erasure frame is that it may not include any type of error correction code.

The P25 protocol states the RAN 150 should substitute an erasure frame for any frame received on the uplink that cannot be sufficiently corrected. As shown, the RAN may send 164-168, over the downlink, a frame containing an erasure pattern to each of the receiver wireless communications devices 130. The purpose of the erasure frame is to notify the receiver wireless communications device that the payload in the frame being received should not be used and alternative processing should be performed. For example, in the case of a voice payload, the receiver wireless device may mute the audio or repeat the audio from the previous frame. It should be noted, that the replacement of an uncorrectable frame with an error frame is specified in the standards applicable to the RAN, and the techniques described herein do not require any modification to the operation of the RAN.

The RAN 150 sends 164-168 the frame including the erasure pattern over the wireless downlink. However, just as on the uplink, there may be errors introduced on the downlink, for at least the same reasons as those errors were introduced on the uplink. When the RAN 150 sends an erasure frame to the receiver wireless devices, there are two possibilities. As shown in FIG. 1, the downlink between the RAN and the receiver wireless devices 130-1, 130-N may be bad. In such cases, the erasure frame may be received with sufficient errors that it cannot be determined to be an erasure frame. In such cases, the receiver device may proceed as if it had received an uncorrectable frame.

Receiver wireless device 130-2 however may have a downlink that is good, in which case the erasure frame may be received without errors. In some cases, the downlink may still introduce some errors (e.g. OK but not perfect downlink, etc.) but the errors are sufficiently small that the receiver wireless communications device can declare, with a high enough degree of confidence, that the received frame is an erasure frame. Thus the receiver wireless communications device knows for sure that the payload of the frame is not usable and can take alternate actions.

The techniques described herein make use of the erasure frame to infer details about the uplink from the sender wireless communications device 110 to the RAN 150. As describe above, the only time the RAN will send an erasure frame to the receiver wireless communications devices 130 is when the frame received from the sender wireless communications device contains so many uncorrectable errors so as to consider the payload of the frame to be useless. The only way this can occur is if there were some problem(s) on the uplink. Analysis of the possible types of uplink problems is described in further detail with respect to FIG. 3. For purposes of the description of FIG. 2, the receipt of an erasure pattern at a receiver wireless communications device indicates a problem on the uplink when that frame was sent to the RAN.

As mentioned above, the erasure frame may be sent with no error correction. Thus it is possible for an erasure frame to be received by a receiver wireless communications device 130 with so many errors introduced by the downlink, that the receiver wireless communications device cannot detect that an erasure frame has been received. As will be described in FIG. 2, the techniques described herein make use of collecting erasure frame data from many receiver wireless communications devices to get a better picture of errors occurring on the uplink between the sender wireless communications device 110 and the RAN 150.

Figure 2:
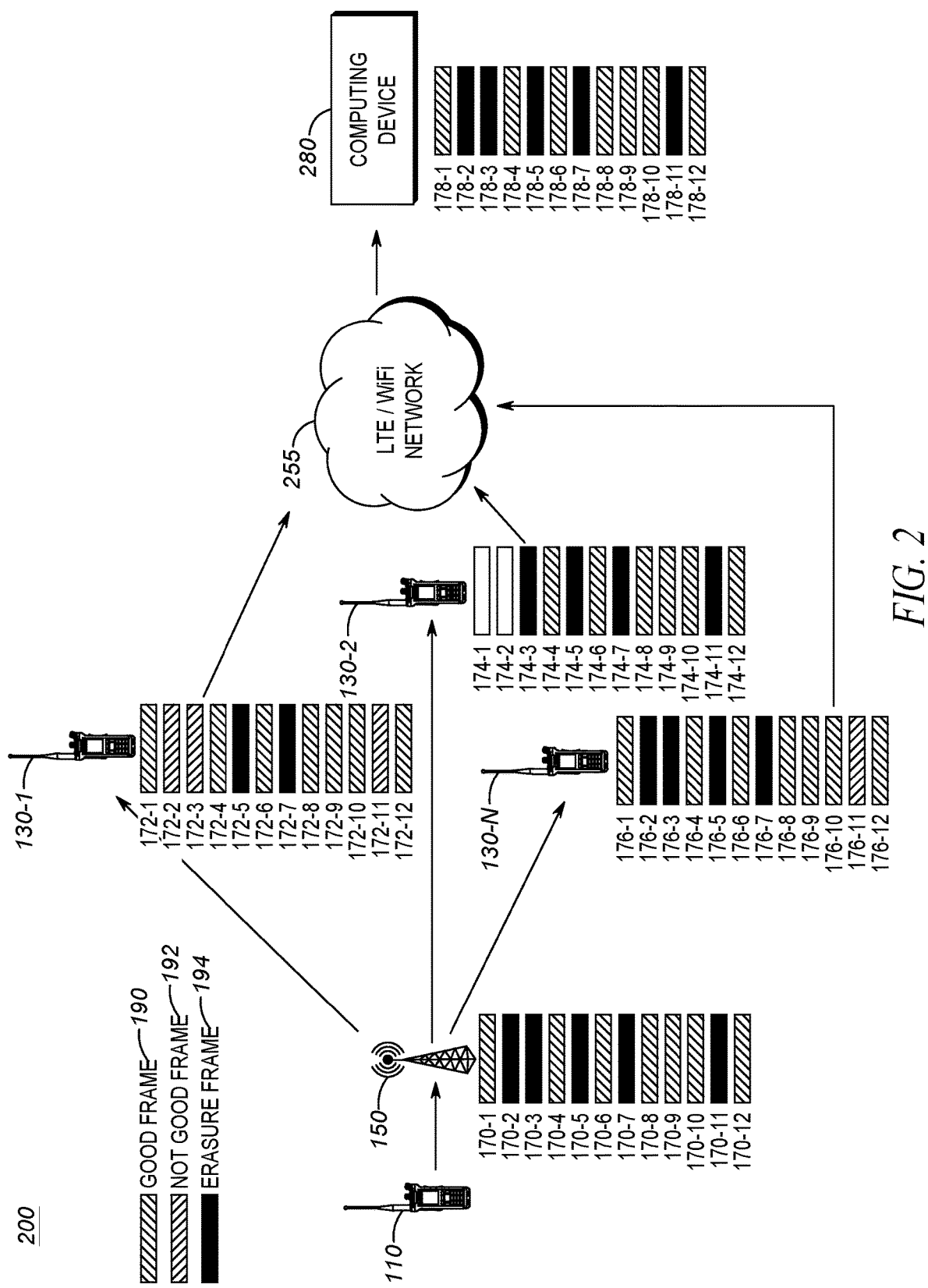
FIG. 2 is another example environment in which the radio frequency uplink performance assessment utilizing downlink erasure frame analysis may be implemented.

FIG. 2 is another example environment in which the radio frequency uplink performance assessment utilizing downlink erasure frame analysis may be implemented. Environment 200 generally includes the same elements as FIG. 1, including a sending wireless communications device 110, receiving wireless communications devices 130-1 . . . N, and a RAN 150. For ease of description, the description of the operation of these elements will not be repeated here. Environment 200 introduces two new elements, LTE/WiFi network 255 and computing device 280.

As mentioned above, the wireless communications devices may include the capability to connect to multiple RANs. For example, they may be able to connect to both an LMR RAN as well as an LTE or WiFi RAN 255. This allows for the wireless communications devices to report frame status to an external device for further analysis, as will be explained in further detail below. By utilizing a separate RAN, the RAN owner may not need to allow access to the RAN 150 for obtaining data from the receiver wireless communication devices 130. However, it should be understood that is some implementations, there are not separate RANs and the functionality provided by RAN 255 is also provided by RAN 150.

Environment 200 also includes computing device 280. The computing device may receive frame information from the receiver wireless communications devices 130 and aggregate the frame information to determine the status of each received frame. As will be described in further detail below, the computing device may perform a union of the status of each frame from each receiver wireless communications device, and if any one of them indicates the presence of an erasure frame, the frame is considered an erasure frame. From this information, the computing device can compute characteristics of the uplink channel, such as a frame error rate.

FIG. 2 defines three types of frames and provides each with a symbolic pattern. Good frames 190 are depicted with a box filled with forward slashes. A good frame is a frame which has no errors, or a sufficiently low number of errors that the payload is still considered usable. Not good frames 192 are designated by a box with backwards slashes. A not good frame is a frame with so many uncorrectable errors that the payload of the frame is considered unusable. Erasure frames 194 are depicted with a box with solid black fill. As explained above, erasure frames are used when the RAN 150 is unable to correct a frame received from the sender wireless communications device 110.

Shown in FIG. 2 is a series of 12 example frames 170-1 . . . 12 that are transmitted from the RAN 150 to receiver wireless communications devices 130. It should be understood that this limited set of frames is provided for purposes of explanation only. What should be noted is that the RAN only transmits good frames or erasure frames. As explained above, transmission of a good frame means the received frame was either error free or was correctable enough to be considered error free. Transmission of an erasure frame means the payload of the received frame was not useful. The RAN would never transmit a known not good frame.

As shown in FIG. 2, frames 170-1,4,6,8-10, and 12 were good frames that were transmitted to receiver wireless communications devices 130. Frames 170-2,3,5,7, and 11 are erasure frames. Although not shown, each frame may be associated with an identifier that allows for the frames to be correlated with one another. Furthermore, frames may be sent in sequence which allows for additional correlation based on the sequence of frames received.

Frames 172-1 . . . 12, 174-1 . . . 12, and 176-1 . . . 12 depict the frames as they were received by each of receiver wireless communications devices 130-1 . . . N. For purposes of this description, the -x reference numeral refers to the same frame. In other words, the first frame 170-1 sent by the RAN corresponds to the frame 172-1, 174-1, 176-1, and 178-1.

As shown, frames 172-1,4,6, 8-10, and 12 were good frames received by wireless communications device 130-1. Frames 172-5 and 7 were erasure frames. However, frames 172-2, 3, and 11 are indicated as being not good frames. As explained above, errors may be introduced on the downlink channel. In some cases, the errors are not correctable to the point where the frame can be treated as a good frame. The errors may also prevent the receiver wireless communications device 130 from determining that a frame was an erasure frame. For example, frames 170-2, 3, 5, 7, and 11 were erasure frames sent by the RAN 150. However, due to errors on the downlink, frames 172-2,3 and 11 included enough errors that the receiver wireless communications device 130-1 could not determine that the received frame was an erasure frame. As such, it is not possible to infer any information about the uplink from the sender wireless communications device from these not good frames.

As shown in FIG. 2, receiver wireless communications device 130-2 shows blank boxes for frames 174-1, 2. This may be because the device was turned off, was outside the coverage area of RAN 150, was inoperative, or for any other number of reasons. What should be understood is that even if a receiver wireless communications device is unable to receive one or more specific frames, the frame identifiers included in the frames of good frames allow for the wireless communication device to synchronize with the stream of incoming frames.

In FIG. 2 it is shown that frames 174-4,6,8-10, and 12 were received as good frames. Frames 174-3,5,7, and 11 were received as erasure frames. Likewise, for receiver wireless communication device 130-n, frames 176-1,4,6,8-10, and 12 were received as good frames, frames 176-2,3,5, and 7 were received as erasure frames, and frame 176-11 was received as a not good frame.

Each of receiver wireless communications devices 130-1 . . . N may send the status of received frames to a computing device 280. For each frame, the computing device may perform a union of the status of each frame. If any receiver wireless communications device reports the frame as an erasure frame, the computing device declares that frame to be an erasure frame. As shown in FIG. 2, when the received frames 172, 174, and 176 are aggregated via this process, frames 178-1 . . . 12 is produced. It should be noted that the set of frames 178 is the same as the set of frames 170, even though none of the receiving wireless communications devices individually received the exact set of frames sent by the RAN 150.

By aggregating the frame status from many receiver wireless communications devices, it provides a greater probability that at least one of the devices would be able to properly determine that a received frame is actually an erasure frame. Thus, if any one receiver device is able to determine a frame is an erasure frame, it guarantees that the frame sent by the RAN was actually an erasure frame. As mentioned above, receipt of an erasure frame indicates some type of problem with the uplink between the sender wireless communications device 110 and the RAN 150.

The computing device 280 may use the aggregated status of received frames to compute characteristics of the uplink channel. In the example shown in FIG. 2, out of 12 frames received 5 of the frames were determined to be erasure frames. Thus, the frame error rate on the uplink would be approximately 42% (5/12). This information may be used, as will be described with respect to FIG. 3, to potentially isolate the problems occurring on the uplink.

Although not shown in FIG. 2, there is one additional possibility. It is possible that all of the receiver wireless communications devices 130 received a not good frame for an erasure frame that was sent by RAN 150, and as such it cannot be determined if the frame was actually an erasure frame or not. A frame that is determined to be not good by all receiver devices provides no basis for inferring a problem on the uplink, because the errors could have been inserted on the downlink. As such, when computing uplink frame error rates, only good frames or erasure frames need be considered.

Figure 3:
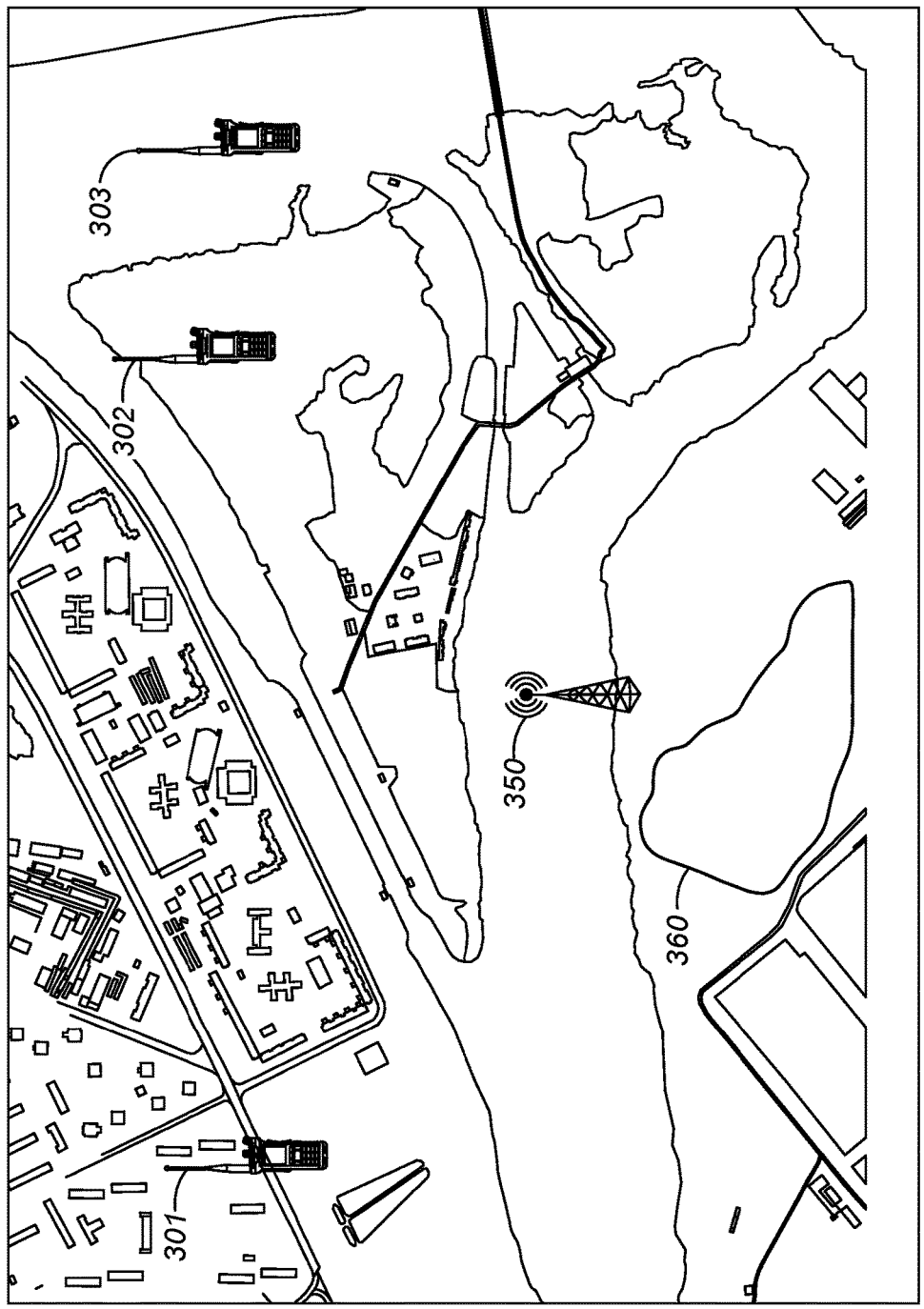
FIG. 3 is an example of using downlink erasure frame analysis to determine uplink problems.

FIG. 3 is an example of using downlink erasure frame analysis to determine uplink problems. The aggregated frame error rate that was described with respect to FIGS. 1 and 2 can be collected for a plurality of sender devices. As is explained in further detail below, this information may be used to diagnose problems within RAN 150. For purposes of this description, a problem with the RAN means any issue that is causing errors on the uplink channel. This could include RAN design issues (e.g. improper RF coverage due to signal strength, antenna orientation, base station placement, etc.). It could also include malfunctioning equipment, within the RAN itself or the wireless communications devices (e.g. improperly calibrated RF transceivers, etc.). It could also include environmental factors (e.g. new construction that alters RF coverage, etc.) What should be understood is that problems within the RAN refer to any issue that causes errors on the uplink and are not limited to only those problems caused by the RAN hardware itself.

It should further be noted that sender wireless communications devices may store information that is useful for diagnosing uplink problems. For example, sender wireless communications devices may store their location (e.g. GPS location, etc.), a time (e.g. time of day, date, etc.), a device identifier (e.g. Device ID, serial number, etc.), and a channel (e.g. frequency, code channel, etc.) in use at the sender wireless communications device. This information may then be sent to computing device 280 over RAN 255 or RAN 150. As mentioned above, RAN owners may not have an issue with allowing access to the individual devices themselves, as opposed to allowing direct connection to the RAN itself. For purposes of this description, the location, time, device identifier, and channel will be referred to as sender device metadata, or just metadata.

It should be noted that the examples presented with respect to FIG. 3 are not intended to be exhaustive list of the types of uplink problem diagnoses that may occur. Furthermore, FIG. 3 is described in terms of extremes (e.g. 100% erasure frame rate, 0% frame error rate, etc.) This is not to imply that such extreme values are necessary, but rather are used to highlight different types of problems on the uplink that may be diagnosed. Environment 300 includes a RAN 350, that is similar to RAN 150 and a plurality of sender wireless communications devices. For ease of description, the receiver wireless communications devices are not shown.

As a simple example, consider a sender wireless device 301 that always has a 100% erasure frame rate, regardless of time, location, or channel. Assuming that at least some other devices using the RAN are operational, this could indicate a hardware problem with device 301. As another example, consider the same wireless sender device 301 if it has a 100% erasure frame rate in a certain location, but has a 0% erasure frame rate in a different location. In such a case, it is likely the uplink issue is related to the RAN coverage in that location, as opposed to a failure of the sender device 301. This could be further confirmed if multiple sender devices (not shown) experience the same problem when in the same area.

In another example, consider two sender devices 302, 303 that are in a similar location, at a similar time, on the same channel. If both devices have 100% frame erasure rates, this may indicate a problem with the RAN 350 equipment providing coverage to that area. As yet another example, if device 302 has a 100% frame error rate and device 303 has a 0% frame error rate, this may indicate a problem with device 302, as opposed to a problem with the RAN 350 equipment.

As yet another example, consider an area 360 wherein sender devices within that area experience a 100% erasure frame rate during certain timeframes, but 0% erasure frame rates at other times. This may indicate that there is a potential interference source in that area that does not operate continuously. If the high erasure rate was constant at all times, this may indicate a problem with the RAN configuration/hardware. However, because the high erasure rate has a time component, it is unlikely (although not impossible) that the RAN hardware would function/not function with a defined period.

Although diagnosis of several types of problems have been described, a person of skill in the art when equipped with the sender device metadata and the erasure frame rate for the sender devices would be able to come up with other any number of data patterns to diagnose other types of problems. What should be understood is that this diagnoses occurs without requiring direct access to the RAN, which may be prohibited by the RAN owner.

Figure 4B:
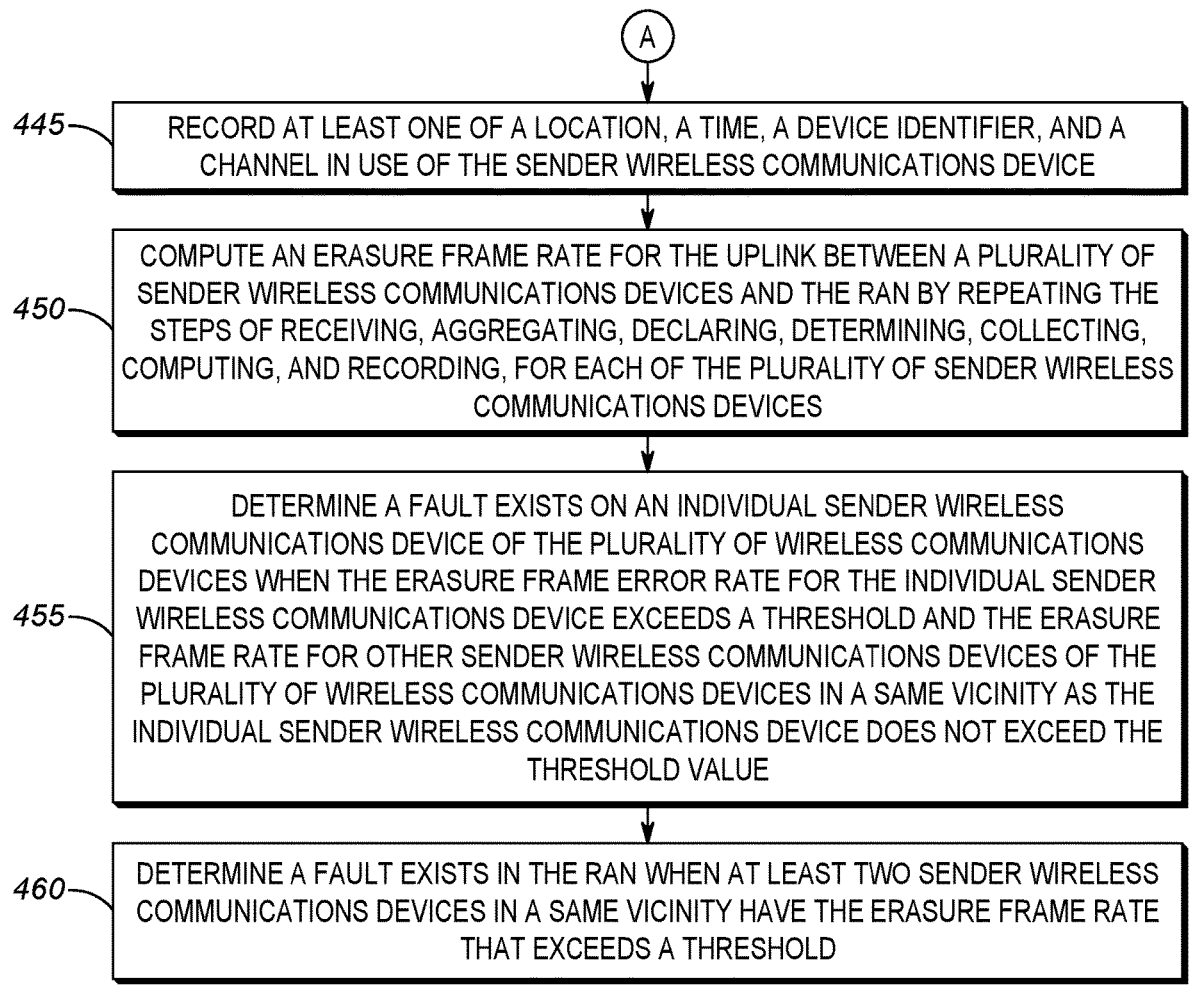

FIGS. 4A and 4B are an example of a flowchart 400 depicting an implementation of the radio frequency uplink performance assessment utilizing downlink erasure frame analysis techniques described herein. In block 405, erasure frames for a plurality of frame identifiers may be collected. As explained above, a number of erasure frames for a set of frames may be collected to determine an erasure frame rate.

Collecting error frame declarations for a plurality of frame identifiers may include several steps. In block 410, a computing device may receive, from each of a plurality of receiver wireless communications devices, an indication of if a received frame has been determined to be an erasure frame, the frame having been sent by a Radio Access Network (RAN) to the plurality of receiver wireless communications devices and identified by a frame identifier, the frame having been sent to the RAN from a sender wireless communications device. In other words, for receiver wireless communications devices in the RAN, the computing device may receive an indication of if a particular, identified received frame is an erasure frame. As explained above, an erasure frame is a frame that is sent by the RAN to receiver wireless communications devices when the frame received from a sender wireless communication device includes some many errors that the payload of the frame is useless.

In block 415, the indications of if the received frame has been determined to be an erasure frame for the frame identified by the frame identifier are aggregated. In essence, the aggregation is the status of the frame (e.g. good, not good, erasure frame) reported by each of the plurality of wireless receiver devices.

In block 420, the frame identified by the frame identifier is declared to be an erasure frame when at least one of the plurality of wireless communications devices has indicated the received frame identified by the frame identifier has been determined to be an erasure frame. The reason for this is because if any device identifies the frame as an erasure frame, that means the RAN sent an erasure frame. As explained above the erasure pattern in an erasure frame is defined such that such a frame is extraordinarily unlikely (or impossible) to be confused with any other valid frame. In other words, if an erasure frame is detected by any receiver device, it is truly an erasure frame that was sent by the RAN.

In block 425, the frame identified by the frame identifier is declared to be a good frame when at least one receiver wireless communication device provides an indication of a good frame. The reason for this is that is at least one receiver device indicates that it received a good frame, then that means the RAN did not send an erasure frame.

In block 430, the frame identified by the frame identifier is declared to be a not good frame when no receiver wireless communications devices indicate an erasure frame or a good frame. The reason for this is that if no device reports a good frame or an erasure frame, it cannot be definitely declared if the frame is good or an erasure frame. Because this cannot be definitely declared, a frame marked as not good is not useful in identifying issues related to the uplink from the sending wireless device to the RAN.

In block 435, it may be determined that an error occurred on an uplink between the sender wireless communication device and the RAN when the frame identified by the frame identifier was sent to the RAN by the sender wireless communications device when the frame is declared an erasure frame. As explained above, the only time an erasure frame may be received is when the erasure frame is sent by the RAN. The only time the RAN will send an erasure frame is when there is some problem on the uplink between the sender wireless communications device and the RAN. Thus, declaration of an erasure frame means there was an uncorrectable problem on the uplink when that frame was sent from the sender wireless communications device to the RAN.

In block 440, an erasure frame rate for the uplink between the sender wireless communications device and the RAN may be computed. The erasure frame rate that is computed is an indication of the quality of the uplink between the sender wireless communications device and the RAN. A high rate indicates problems with the uplink, while a low rate indicates the uplink is operating properly. It should be noted that although a high rate may indicate problems with the uplink, this may be by design. For example, due to any number of system design constraints (e.g. not possible to locate a base station where needed due to zoning rules, etc.), it may be determined that a high rate of uplink errors is acceptable in a given area.

In block 445, at least one of a location, a time, a device identifier, and a channel in use of the sender wireless communications device may be recorded. As described with respect to FIG. 3, this metadata may be used to diagnose problems with the uplink in the RAN.

In block 450, a frame error rate for the uplink between a plurality of sender wireless communications devices and the RAN by repeating the steps of receiving, aggregating, declaring, determining, collecting, computing, and recording, for each of the plurality of sender wireless communications devices may be computed. In other words, steps 405-445 may be repeated for a plurality of sender wireless communications devices in order to judge uplink quality for several sender devices. This information may then be useful for diagnosing uplink problems within the RAN.

For example, in block 455, it may be determined that a fault exists on an individual sender wireless communications device of the plurality of wireless communications devices when the erasure frame rate for the individual sender wireless communications device exceeds a threshold and the erasure frame rate for other sender wireless communications devices of the plurality of wireless communications devices in a same vicinity as the individual sender wireless communications device does not exceed the threshold value. In other words, if one sender device has a computed erasure frame rate that is above a threshold while other devices in the same general vicinity do not have an erasure frame rate that is above the threshold, this may indicate a problem with that specific device. It should be noted that the thresholds may be configurable. For example, the threshold could be configured such greater than 0%, greater than 10%, greater than 50%, or any other rate. The techniques described herein are not dependent on the selection of any particular threshold.

As another example, in block 460, it may be determined that a fault exists in the RAN when at least two sender wireless communications devices in a same vicinity have a frame error rate that exceeds a threshold. The reason for this is that if two sender devices are both experiencing uplink problems in the same area, there is a higher likelihood that the problem is with the RAN equipment as opposed to tow separated sender devices experiencing the same sender device fault.

Figure 5:
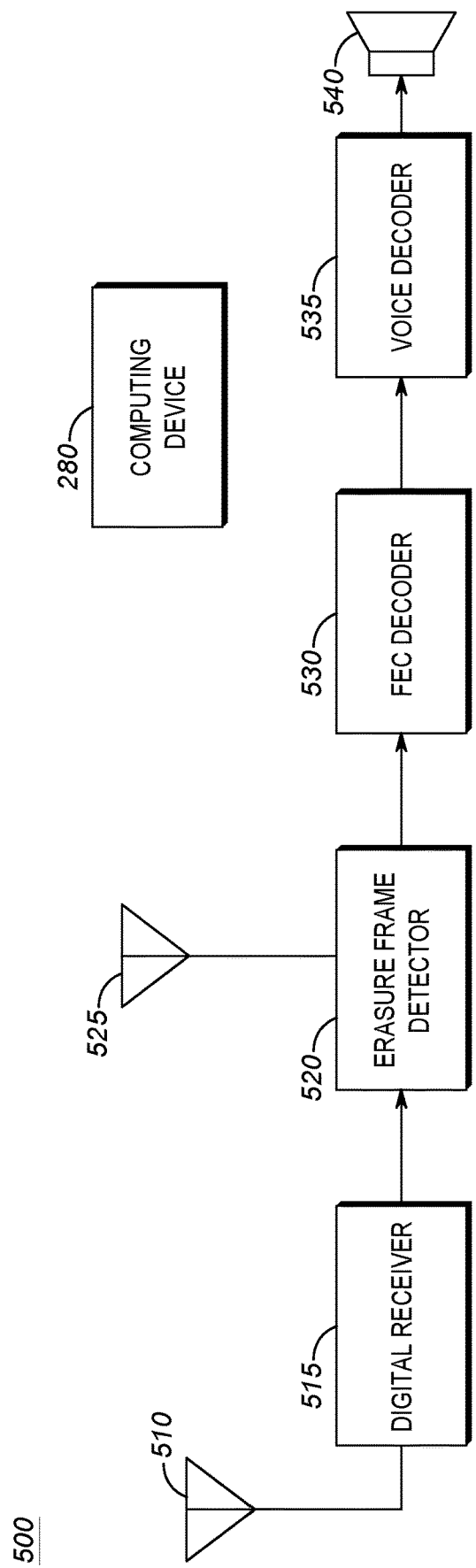
FIG. 5 is an example wireless communications device on which the techniques described herein may be implemented.

FIG. 5 is an example receiver wireless communications device 500 on which the techniques described herein may be implemented. A more detailed description of such a device is described with respect to FIG. 7. Device 500 may include an RF receiver 510 to receive RF signals from the RAN via an air interface. The RF receiver may be coupled to a digital receiver 515. The digital receiver may be responsible for converting the received RF signals into baseband frames, which can also be referred to as frames or received frames.

The digital receiver 515 may be coupled to an erasure frame detector 520. The erasure frame detector may be a module that takes the received frame from the digital receiver and determines if the frame is an erasure frame by comparing the baseband frame with a reference erasure frame. In some cases, there may be a configurable threshold value (e.g. 0%, 10%, 50%, etc.) which may be used to determine of the frame is an erasure frame. For example, if the differences between the baseband frame and the reference erasure frame do not exceed a threshold (e.g. the baseband frame is "close enough" to the reference erasure frame), the frame may be considered an erasure frame. If the frame is an erasure frame, the erasure frame detector may store this information. The erasure frame detector may be coupled to an RF transmitter 525 that allows for communication with a separate RAN. The erasure frame detector may provide an indication of if a frame was an erasure frame to a computing device 280 over the separate RAN. In addition to providing erasure frame data to the computing device, device 500 may provide sender wireless communication device metadata to the computing device when the device 500 is acting as a sender. As explained above, the metadata may be useful in diagnosing faults on the uplink to the RAN.

Device 500 may also include Forward Error Correction (FEC) decoder 530 to determine if a received frame includes errors, and if those errors can be corrected. If the errors cannot be sufficiently corrected, the frame may be determined to be a not good frame. In some implementations, this information may be sent to the computing device. If the fame is error free or contains an acceptable amount of errors, the frame may be declared a good frame. Again, this information may be sent to the computing device.

Device 500 may also include a voice decoder. In the case of a payload that includes audio data, voice decoder 535 may convert the payload to an electronic waveform that can be sent to speaker 540. Speaker 540 may then audibly output the received audio.

Although the erasure frame detector 520 is shown as a standalone element, in some implementations, the erasure frame detector may be integrated with other elements, such as the FEC decoder 530 or the voice decoder 535.

To improve efficiency, in some implementations, the device 500 may store the erasure frame declarations for a plurality of baseband frames. The device may then report the erasure frame declarations for the plurality of baseband frames to an analysis system, such as one implemented by computing device 280. By storing several declarations and reporting them together, the device may limit the amount of time it needs to be continuously connected to the computing device 280.

Figure 6:
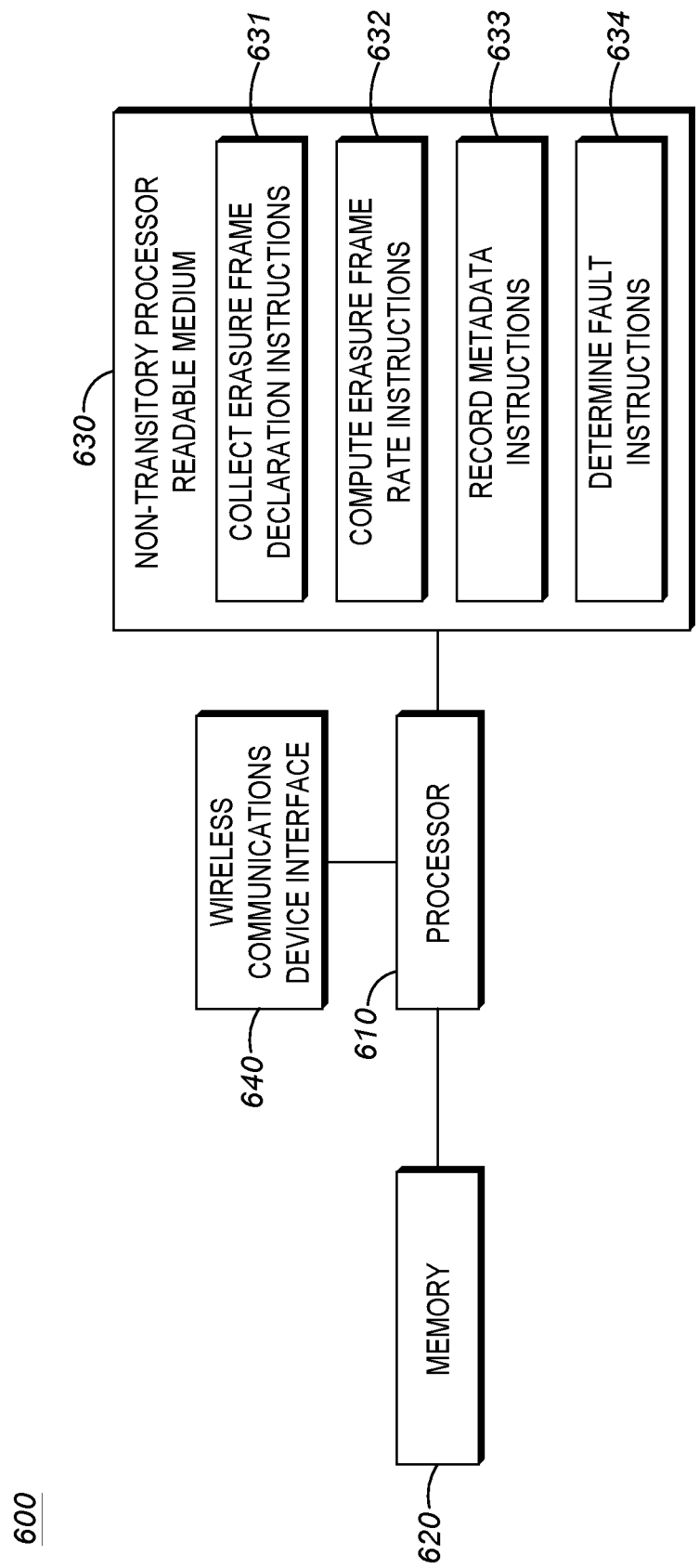
FIG. 6 is an example computing device that may implement the radio frequency uplink performance assessment utilizing downlink erasure frame analysis techniques described herein.

FIG. 6 is an example computing device 600 that may implement the radio frequency uplink performance assessment utilizing downlink erasure frame analysis techniques described herein. It should be understood that FIG. 6 represents one example implementation of a computing device that utilizes the techniques described herein. Although only a single processor is shown, it would be readily understood that a person of skill in the art would recognize that distributed implementations are also possible. For example, the various pieces of functionality described above (e.g. erasure frame declaration, RAN fault detection, etc.) could be implemented on multiple devices that are communicatively coupled. FIG. 6 is not intended to imply that all the functionality described above must be implemented on a single device. Furthermore, FIG. 6 is not intended to imply any particular hardware or location for implementation of device 600. Device 600 may be implemented as an on premises device(s) or in a cloud computing environment.

Device 600 may include processor 610, memory 620, non-transitory processor readable medium 630, and wireless communications device interface 640.

Processor 610 may be coupled to memory 620. Memory 620 may store a set of instructions that when executed by processor 610 cause processor 610 to implement the techniques described herein. Processor 610 may cause memory 620 to load a set of processor executable instructions from non-transitory processor readable medium 630. Non-transitory processor readable medium 630 may contain a set of instructions thereon that when executed by processor 610 cause the processor to implement the various techniques described herein.

For example, medium 630 may include collect erasure frame declaration instructions 631. The collect erasure frame declaration instructions 631 may cause the processor to receive erasure frame declarations form a plurality of receiver wireless communications devices 130. For example, device 600 may utilize the wireless communications device interface 640 to communicate with receiver wireless communications devices over a RAN that that may or may not be separated from RAN that is being monitored. The collection of erasure frames may be conducted for a plurality of sender wireless communications devices. The collect erasure frame declaration instructions 631 have been described throughout this description generally, including places such as the description of blocks 405-435.

Medium 630 may include compute erasure frame rate instructions 632. The compute erasure frame rate instructions 632 may cause the processor to determine the erasure frame rate on an uplink between the sender wireless communications device and the RAN. The compute frame rate instructions 632 may also cause device 600 to compute the uplink erasure frame rate for a plurality of sender wireless communications devices. The compute frame rate instructions 632 have been described throughout this description generally, including places such as the description of blocks 440 and 450.

Medium 630 may include record metadata instructions 633. The record metadata instructions 633 may cause device 600 to collect data, such as location, channel, time, and device identifier from sender wireless communications devices 110. This metadata may be used by the device 600 when determining the cause of faults on the uplink channel when used in conjunction with the erasure frame rates. The device 600 may receive this metadata over the wireless communications device interface 640, which was described above. The record metadata instructions 633 have been described throughout this description generally, including places such as the description of block 445.

Medium 630 may include determine fault instructions 634. The determine fault instructions 634 may cause device 600 to utilize the erasure frame rate information and the collected sender wireless communications device metadata to detect faults within the RAN. The determine fault instructions 634 have been described throughout this description generally, including places such as the description of blocks 455 and 460.

Figure 7:
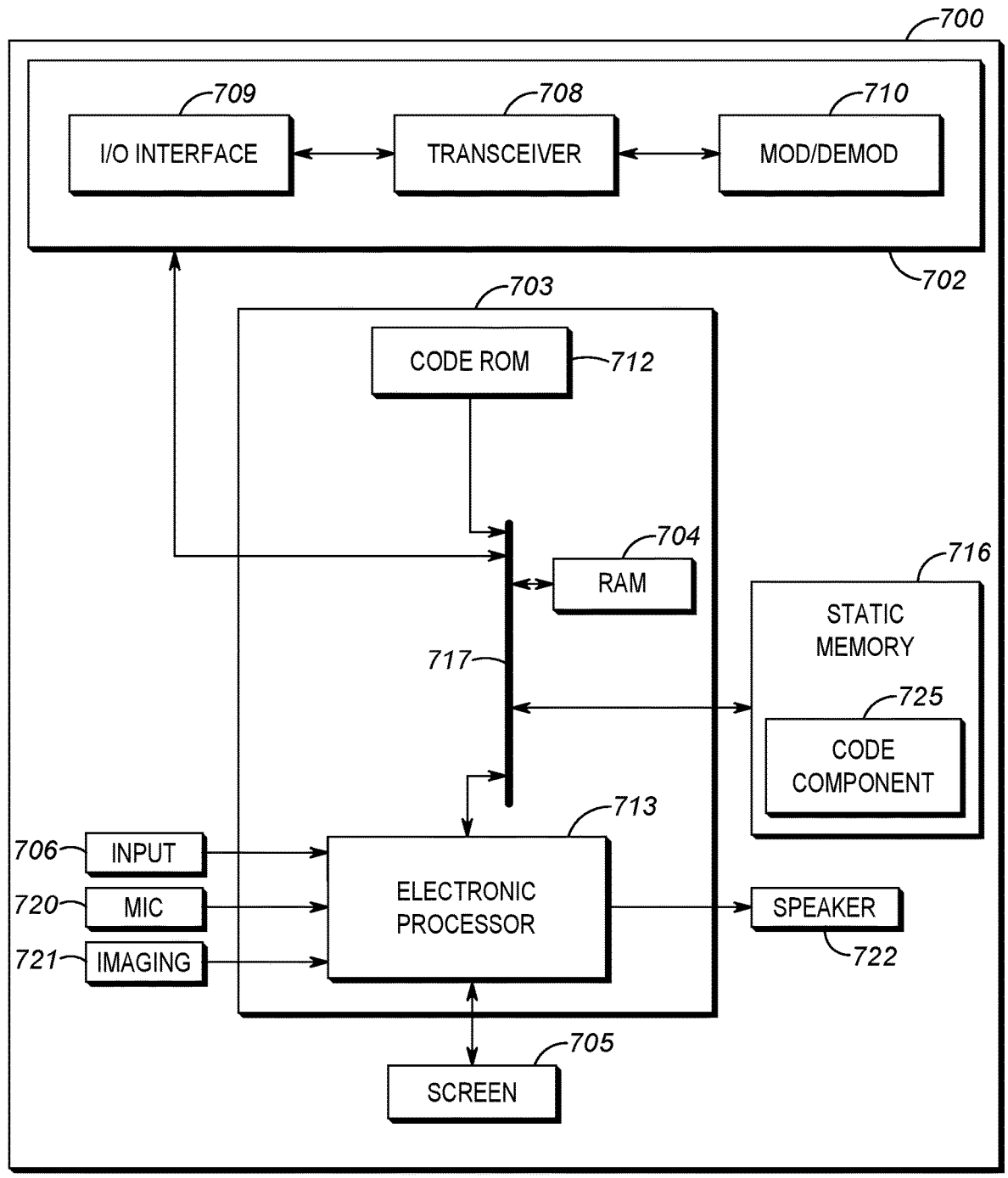
FIG. 7 is an example wireless communications device that may implement the techniques described herein.

FIG. 7 is an example wireless communications device that may implement the techniques described herein. The wireless communication device 700 may be, for example, either a sender wireless communications device 110 or a receiver wireless communications device 130. In a typical implementation, the capabilities of both sender and receiver wireless communications devices will be embodied in a single device that can act as both a sender at some times and a receiver at other times. Communications device 700 may be a single device and/or may be a distributed communication device across two or more of the foregoing (or multiple of a same type of one of the foregoing) and linked via a wired and/or wireless communication link(s). In some embodiments, the communication device 700 (for example, the sender or receiver wireless communications device) may be communicatively coupled to other devices such as the computing device 280 as described above.

While FIG. 7 represents the wireless communication devices described above with respect to FIG. 1, depending on the type of the communication device, the communication device 700 may include fewer or additional components in configurations different from that illustrated in FIG. 7. For example, in some embodiments, communication device 700 may not include one or more of the screen 705, input device 706, microphone 720, imaging device 721, and speaker 722. As another example, in some embodiments, the communication device 700 may further include connections to external devices (not shown). Other combinations are possible as well.

As shown in FIG. 7, communication device 700 includes a communications unit 702 coupled to a common data and address bus 717 of a processing unit 703. The communication device 700 may also include one or more input devices (e.g., keypad, pointing device, touch-sensitive surface, etc.) 706 and an electronic display screen 705 (which, in some embodiments, may be a touch screen and thus also act as an input device 706), each coupled to be in communication with the processing unit 703.

The microphone 720 may be present for capturing audio from a user and/or other environmental or background audio that is further processed by processing unit 703 in accordance with the remainder of this disclosure and/or is transmitted as voice or audio stream data, or as acoustical environment indications, by communications unit 702 to other portable radios and/or other communication devices. The imaging device 721 may provide video (still or moving images) of an area in a field of view of the communication device 700 for further processing by the processing unit 703 and/or for further transmission by the communications unit 702. A speaker 722 may be present for reproducing audio that is decoded from voice or audio streams of calls received via the communications unit 702 from other portable radios, from digital audio stored at the communication device 700, from other ad-hoc or direct mode devices, and/or from an infrastructure RAN device, or may playback alert tones or other types of pre-recorded audio.

The processing unit 703 may include a code Read Only Memory (ROM) 712 coupled to the common data and address bus 717 for storing data for initializing system components. The processing unit 703 may further include an electronic processor 713 (for example, a microprocessor or another electronic device) coupled, by the common data and address bus 717, to a Random Access Memory (RAM) 704 and a static memory 716.

The communications unit 702 may include one or more wired and/or wireless input/output (I/O) interfaces 709 that are configurable to communicate with other devices, such as the computing system 280.

For example, the communications unit 702 may include one or more wireless transceivers 708, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The electronic processor 713 has ports for coupling to the display screen 705, the input device 706, the microphone 720, the imaging device 721, and/or the speaker 722. Static memory 716 may store operating code 725 for the electronic processor 713 that, when executed, performs one or more of the steps set forth in FIG. 5 and accompanying text.

In some embodiments, static memory 716 may store, permanently or temporarily, instructions to implement the functionality described above. For example, static memory 716 may include instructions that generally correspond to instructions that cause the processor to implement the functionality described with respect to the sender and receiver wireless communications devices. The static memory 716 may comprise, for example, a hard-disk drive (HDD), an optical disk drive such as a compact disk (CD) drive or digital versatile disk (DVD) drive, a solid state drive (SSD), a flash memory drive, or a tape drive, and the like.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot [include a particular function/feature from current spec], among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
receiving, at a computing device, from each of a plurality of receiver wireless communications devices, an indication of if a received frame has been determined to be an erasure frame, the received frame having been sent by a Radio Access Network (RAN) to the plurality of receiver wireless communications devices and identified by a frame identifier, the received frame having been sent to the RAN from a sender wireless communications device;
aggregating the indications of if the received frame has been determined to be an erasure frame for the frame identified by the frame identifier;
declaring the frame identified by the frame identifier to be an erasure frame when at least one of the plurality of wireless communications devices has indicated the received frame identified by the frame identifier has been determined to be an erasure frame; and
determining that an error occurred on an uplink between the sender wireless communication device and the RAN when the frame identified by the frame identifier was sent to the RAN by the sender wireless communications device when the frame is declared an erasure frame.

2. The method of claim 1 further comprising:
collecting erasure frame declarations for a plurality of frame identifiers; and
computing an erasure frame rate for the uplink between the sender wireless communications device and the RAN.

3. The method of claim 2 further comprising:
recording at least one of a location, a time, a device identifier, and a channel in use of the sender wireless communications device.

4. The method of claim 3 further comprising:
computing an erasure frame rate for the uplink between a plurality of sender wireless communications devices and the RAN by repeating the steps of receiving, aggregating, declaring, determining, collecting, computing, and recording, for each of the plurality of sender wireless communications devices.

5. The method of claim 4 further comprising:
determining a fault exists on an individual sender wireless communications device of the plurality of wireless communications devices when the erasure frame rate for the individual sender wireless communications device exceeds a threshold and the erasure frame rate for other sender wireless communications devices of the plurality of wireless communications devices in a same vicinity as the individual sender wireless communications device does not exceed the threshold value.

6. The method of claim 4 further comprising:
determining a fault exists in the RAN when at least two sender wireless communications devices in a same vicinity have erasure frame error rates that exceed a threshold.

7. The method of claim 1 further comprising:
declaring the frame identified by the frame identifier to be a good frame when at least one receiver wireless communication device provides an indication of a good frame; and
declaring the frame identified by the frame identifier to be a not good frame when no receiver wireless communications devices indicate an erasure frame or a good frame.

8. A non-transitory processor readable medium containing a set of instructions thereon that when executed by the processor cause the processor to:
receive, at a computing device, from each of a plurality of receiver wireless communications devices, an indication of if a received frame has been determined to be an erasure frame, the received frame having been sent by a Radio Access Network (RAN) to the plurality of receiver wireless communications devices and identified by a frame identifier, the received frame having been sent to the RAN from a sender wireless communications device;
aggregate the indications of if the received frame has been determined to be an erasure frame for the frame identified by the frame identifier;
declare the frame identified by the frame identifier to be an erasure frame when at least one of the plurality of wireless communications devices has indicated the received frame identified by the frame identifier has been determined to be an erasure frame; and
determine that an error occurred on an uplink between the sender wireless communication device and the RAN when the frame identified by the frame identifier was sent to the RAN by the sender wireless communications device when the frame is declared an erasure frame.

9. The medium of claim 8 further comprising instructions to:
collect erasure frame declarations for a plurality of frame identifiers; and
compute an erasure frame rate for the uplink between the sender wireless communications device and the RAN.

10. The medium of claim 9 further comprising instructions to:
record at least one of a location, a time, a device identifier, and a channel in use of the sender wireless communications device.

11. The medium of claim 10 further comprising instructions to:
compute an erasure frame rate for the uplink between a plurality of sender wireless communications devices and the RAN by repeating the steps of receiving, aggregating, declaring, determining, collecting, computing, and recording, for each of the plurality of sender wireless communications devices.

12. The medium of claim 11 further comprising instructions to:
   determine a fault exists on an individual sender wireless communications device of the plurality of wireless communications devices when the erasure frame rate for the individual sender wireless communications device exceeds a threshold and the erasure frame rate for other sender wireless communications devices of the plurality of wireless communications devices in a same vicinity as the individual sender wireless communications device does not exceed the threshold value.

13. The medium of claim 11 further comprising instructions to:
   determine a fault exists in the RAN when at least two sender wireless communications devices in a same vicinity have erasure frame error rates that exceeds a threshold.

14. The medium of claim 8 further comprising instructions to:
   declare the frame identified by the frame identifier to be a good frame when at least one receiver wireless communication device provides an indication of a good frame; and
   declare the frame identified by the frame identifier to be a not good frame when no receiver wireless communications devices indicate an erasure frame or a good frame.

15. A device comprising:
   a radio frequency (RF) receiver to receive RF signals over an air interface from a Radio Access Network;
   a digital receiver to convert the received RF signals to a baseband frame, the baseband frame identified by a frame identifier;
   an erasure frame detector to compare the baseband frame to a reference erasure frame, the erasure frame detector configured to declare the baseband frame an erasure frame based on the comparison, the erasure frame detector further configured to store the declaration of the erasure frame for later reporting to an analysis system.

16. The device of claim 15, wherein declaring the baseband frame identified by the frame identifier to be an erasure frame further comprises:
   declaring the baseband frame to be an erasure frame when differences between the baseband frame and the reference erasure frame are below a threshold.

17. The device of claim 15 wherein the erasure frame detector is integrated within a forward error correction (FEC) decoder.

18. The device of claim 15 wherein the erasure frame detector is integrated within a voice decoder.

19. The device of claim 15 wherein the erasure frame detector is further configured to:
   store the erasure frame declarations for a plurality of baseband frames; and
   report the erasure frame declarations for the plurality of baseband frames.

20. The device of claim 19 wherein reporting the erasure frame declarations further comprises:
   reporting the erasure frame declarations when connected to a RAN that is different than a RAN from which the baseband frame was received, wherein the RAN from which the baseband frame was received is a Land Mobile Radio (LMR) RAN and the RAN that is different is one of a Long Term Evolution (LTE) RAN and a WiFi RAN.

* * * * *